Oct. 25, 1932.  J. A. MOSHER  1,884,808
AIR CLEANER
Filed March 30, 1931   2 Sheets-Sheet 1

INVENTOR
John A. Mosher
BY
Westall and Wallace
ATTORNEYS

Oct. 25, 1932.    J. A. MOSHER    1,884,808
AIR CLEANER
Filed March 30, 1931    2 Sheets-Sheet 2
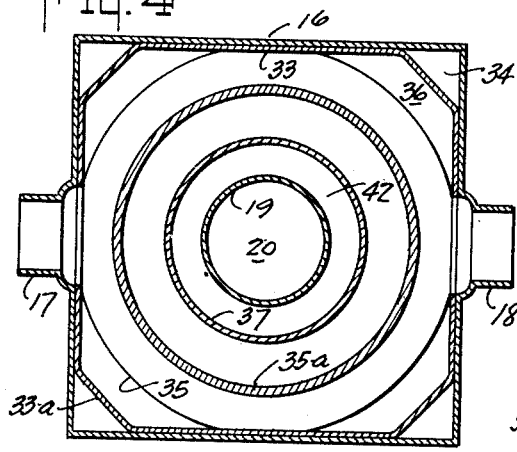
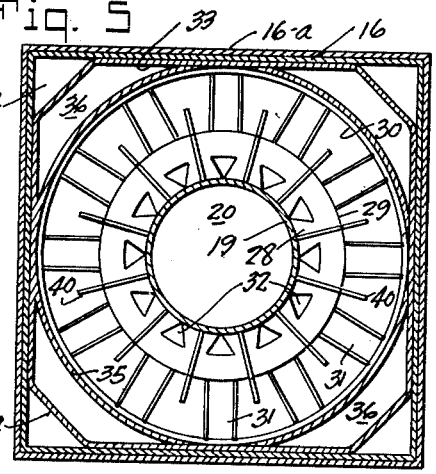
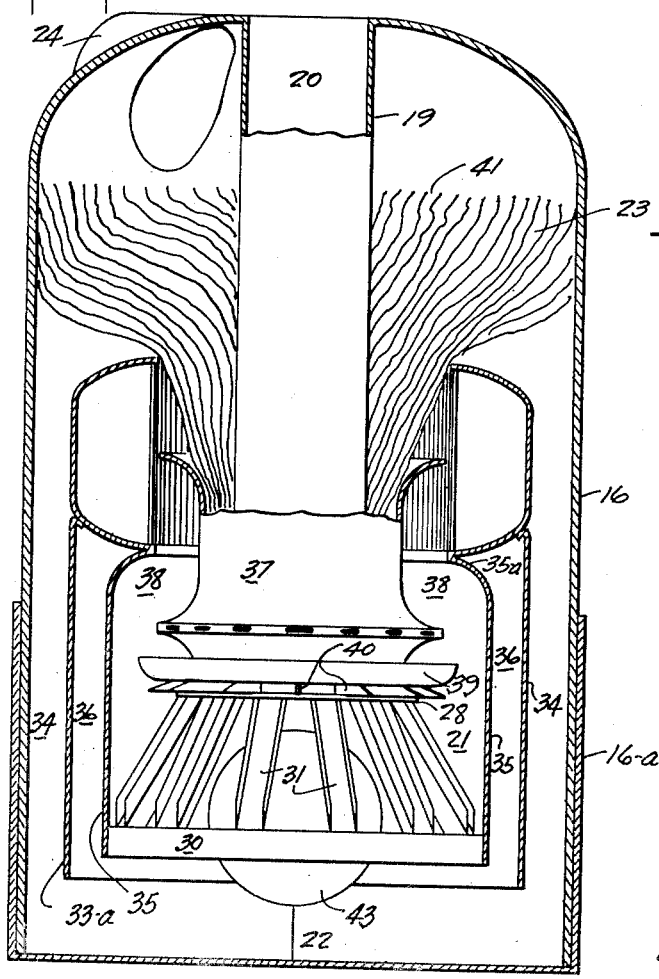
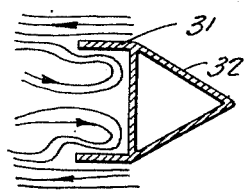
INVENTOR
John A. Mosher
BY
Westall and Wallace
ATTORNEYS Patented Oct. 25, 1932

1,884,808

UNITED STATES PATENT OFFICE

JOHN A. MOSHER, OF POMONA, CALIFORNIA

AIR CLEANER

Application filed March 30, 1931. Serial No. 526,185.

This invention relates to a method of producing a liquid mist and an air cleaner wherein non-gaseous particles entrained in a stream of air are separated therefrom. In a specific aspect it contemplates a cleaner employing a mist of oily liquid through which the air stream is passed and whereby the non-gaseous or foreign particles collect oil and are thereby increased in weight facilitating separation. The present invention contemplates the use of what may be termed a "mist screen" through which the air stream may be passed and a separator for the oil, particles, and air. It will be understood that the term "air" is used herein in its broad meaning of any gaseous mass.

The objects of this invention are to provide a method and a cleaner having any or all of the following characteristics: induction of the flow of liquid from a liquid mass by passing air by a surface and creating at a marginal edge an area of low pressure and spilling liquid over said edge; means for carrying out said method; a liquid eduction and mist creating means relying upon a difference in pressure on surfaces interposed in the path of flow of an air stream and an edge over which oil may spill from the zone of low pressure to that of higher pressure; an air cleaner of the character described comprising a chamber into which air is passed for cleaning, an oil sump, a mist creating means of the character before described and a separator permitting the passage of cleansed air and return of oil and foreign particles to the sump; an air cleaner of the character before described associated with an internal combustion engine and wherein the mist screen is heated by the exhaust of the engine, thereby increasing fluidity of the oil and enhancing its adherence to the particles and its return flow to the sump as well as heating the air; means employing the exhaust as before described and taking advantage of its pressure to aid in lifting the oil from the sump to its mist production level; a novel separator means; and positioning of the air intake, mist and separator chambers in nested relation to provide a compact structure.

Figure 1:
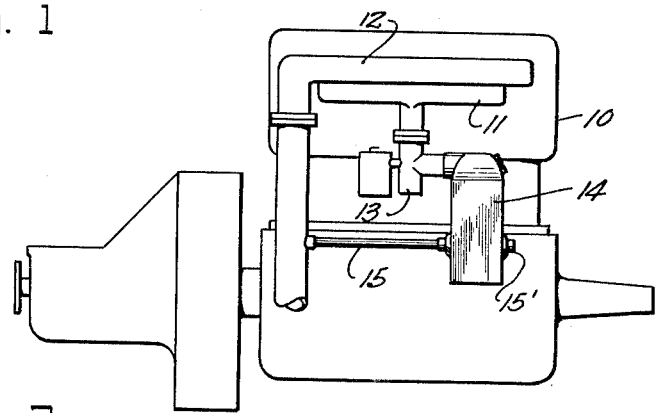
Figure 2:
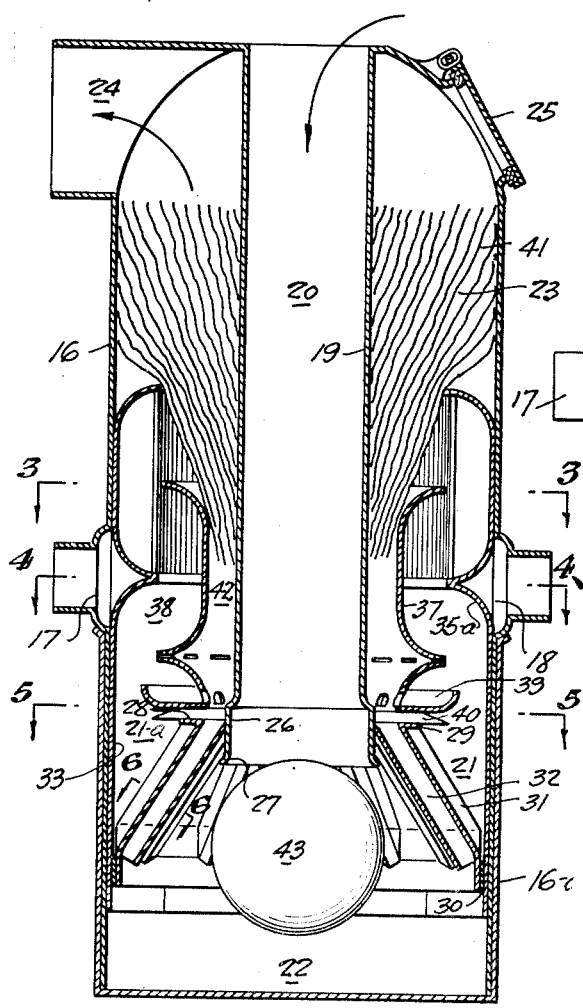
Figure 3:
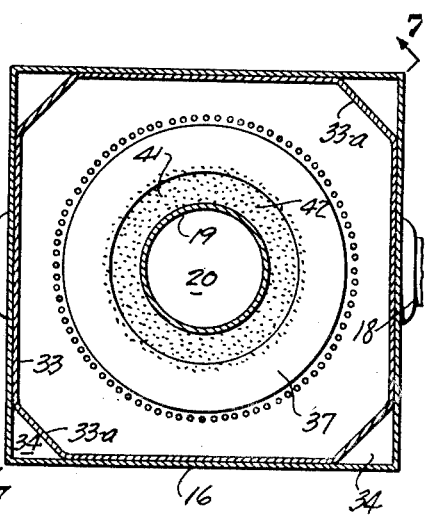

These objects together with other objects and corresponding accomplishments are obtained by means of the embodiment of the invention shown in the accompanying drawings, in which:

Fig. 1 is a side elevation of an automobile gas engine with a carburetor and my improved air cleaner connected thereto; Fig. 2 is a vertical section through the air cleaner; Figs. 3, 4, 5 and 6 are sections as seen on the lines correspondingly numbered in Fig. 2; and Fig. 7 is a section as seen on the line 7—7 of Fig. 3.

Referring more particularly to Fig. 1 of the drawings, an automobile engine is marked 10. The engine is provided with an intake manifold 11 and an exhaust manifold 12. Connected to the intake manifold is a carburetor 13, and the air intake of the carburetor is connected to my improved air cleaner 14. Extending from the exhaust pipe to a stove on the air cleaner is a pipe 15, there being a discharge 15' where the exhaust gases may pass from the stove.

Referring to details of the air cleaner, it comprises a housing shell 16. The shell is closed at its lower end preferably by a slip-on bottom 16a forming a part of the housing shell and enabling easy assemblage. The housing shell is shown square in cross section, although the invention is not limited to such shape. It is formed at about its mid-section with an exhaust gas inlet 17 and an exhaust gas outlet 18. An air intake shell of tubular form indicated by 19 extends from the upper end of the housing shell to a point short of the bottom thereby providing an intake chamber 20. Below the lower end of the intake shell a mixing chamber 21 is provided and below the mixing chamber an oil sump 22. The mixing chamber 21 and oil sump 22 are in free communication, the mixing chamber surmounting the sump. Between the air intake shell and the housing shell a circumferential chamber 23 is formed. The circumferential chamber is closed at the top except for an outlet 24 for cleansed air. An opening is provided at the top of the housing shell and is normally closed by a flap valve 25. The lower end of the intake shell is belled as indicated by 26 and provided with an outstanding lip 27.

Surrounding the lower end of the intake shell is a petticoat 28. The petticoat comprises a waist ring 29 and a skirt band 30 which hugs the housing shell. Extending between the waist ring 29 and skirt band are channel shaped ribs 31. The webs of the ribs have on the near or inner sides ducts 32 which are shown triangular in shape and opening through the waist ring as best shown in Fig. 5. The legs of the channels 31 extend outwardly from the far sides of the webs. The petticoat is broadly a wall, having slots for the passage of air therethrough and the far side of the mixing chamber constitutes an oil mist chamber marked 21a. The skirt is disposed at a point such that it will be submerged in the oil contained in the sump 22. Air which is sucked into the carburetor passes downwardly through the intake chamber 20 and thence outwardly through the slots in the petticoat and upwardly by way of the circumferential chamber and through the outlet 24. In its passage through a slot, and over the legs, striae of low pressure are formed on the inner sides of the legs extending from the oil level in the sump upwardly. This is indicated by the flow lines in Fig. 6. Oil from the sump then passes upwardly along the striae and spills over the edges to form an oil mist, through which the air might pass. The mist then passes upwardly through the circumferential chamber 23 and any foreign or non-gaseous particles acquire a coating of oil. The foreign particles and oil are separated from the air in a separator hereafter described.

Within the housing shell is a wall 33 extending upwardly. This wall is bevelled at the corners as indicated by 33a to provide outer channels or passages 34 extending the length of the wall and ending at the lower end to communicate with the oil in the sump. Passages 34 serve for return of oil from the separator to the sump. An inner wall 35, in general of circular shape, has an annular reentrant portion 35a and is swelled outwardly at the top to merge with the outer wall 33 and thereby form a stove closed at the top and open at the bottom through four passages 36 as best shown in Figs. 4, 5 and 7. Walls 33 and 35 are joined at the top to close the annular channel formed at the reentrant portion of the wall 35, and the channel is connected at this portion to the inlet 17 for exhaust gases and the outlet 18. Surrounding the intake shell is a baffle member 37 comprising a wall warped longitudinally, extending to the waist ring 29 and forming with the wall 35 a tortuous annular passage 38. A through collar 39 is disposed above the waist ring 29 and supported thereover by ribs 40, which ribs are extended to overhang the waist ring and serve as drip points for returning oil as well as aiding in forming mist. In the circumferential chamber 23 is a mass of steel wool 41, or the like, acting as a separator for oil, foreign particles and air. In the construction shown best in Fig. 2, the lower surface of the mass of wool is inclined inwardly to a passage 42 formed between wall 37 and the intake shell 19. Oil may pass through the space 42 to the troughs 32 and drain back to the sump.

In the operation of the cleaner, air passes downwardly through the intake shell 19 to the mixing chamber 21 and therein it passes through the slots in the petticoat 28 creating a mist in mist chamber 21a, the oil enveloping foreign particles, and the mist with air and entrained foreign particles then passes upwardly through the tortuous passage 38 to the separator wool 41. During its passage, its momentum will cause some of the oil and foreign particles to be deposited on the walls of passage 38 and will drain back into the sump. The mist, air and particles not separated in the passage 38 finally reach the filter formed by the wool 41 and are here separated, the oil and foreign particles draining downwardly and through the passages 34 and 42. The mist is heated by the stove and the pressure of the exhaust gases acting through chambers 36 is exerted upon the oil in the sump tending to raise the level outside of the chambers 36 and thus aid in lifting the oil. The oil and foreign particles returned to the sump is separated by gravitation, the sump serving as a settling chamber. In case of back firing of the engine from outlet 24 from the intake manifold 11, a check float valve 43 will impede the passage of fluid into the air intake chamber and valve 25 will open to relieve pressure in the cleaner and thereby avoid blowing oil out of the sump with attendant results of uncleanliness and loss of oil for the production of mist. Float 43 is preferably a ball formed with a rugged or uneven surface, as indentations or with short bristles, which will retain a surface supply of oil. Dirt coming in contact with the surface of the float will lodge in the oil thereon and finally cause an overbalance of the ball, resulting in the ball turning over and the dirt laden oil being washed from the ball into the sump. On turning, the ball presents a new oiled surface to the incoming air upon which dirt may lodge. Any float corresponding to the opening from the air intake 20 and having a curved surface may be employed, such as a cylinder, coacting with a rectangular port. A further action of the float is that of causing eddies of the oil in the sump which aid in washing from the inner sides of ribs 31 any dirt which may lodge thereon.

What I claim is:—

1. The method of producing a liquid mist, which comprises partially submerging in a liquid mass a solid medium having a marginal edge extending upward above the liquid mass, passing a stream of air over said edge and thereby creating a stria of low pressure on a surface of said medium and ranging along said edge to said liquid mass, and along which liquid is caused to flow from said mass, and inducing by said air stream the spilling of liquid from the medium over said edge into said air stream.

2. The method of producing a liquid mist, which comprises partially submerging in a liquid mass a medium having an opening extending upward from the liquid mass, passing a stream of air through said opening and thereby creating a zone of low pressure along the marginal edge of said opening to which liquid flows from said mass, and inducing by said air stream the spilling of liquid over said edge into said air stream.

3. The method of producing a liquid mist, which comprises partially submerging in a liquid mass a solid medium having a marginal edge extending upward from the liquid mass, passing air by said edge creating an area of low pressure at said edge extending to said liquid mass along which liquid flows from said mass, and inducing, by means of the passage of air, spilling of liquid from said area over said edge into said air stream.

4. The method of producing a liquid mist, which comprises partially submerging in a liquid mass a solid medium having a marginal edge, passing air by said medium and inducing an area of low pressure thereon extending upward from the liquid mass, causing liquid to flow from said mass into said area and to spill over said marginal edge into the body of air passing by said medium.

5. An air cleaner comprising a shell having an uncleansed air inlet; a cleansed air outlet; an oil mist chamber in said shell intermediate said inlet and outlet; an oil sump for supply of oil to create a mist; and a wall interposed between said air inlet and oil mist chamber in the path of flow of air, said wall extending into said sump and serving as a way for the travel of oil out of said sump, said wall having a spilling edge over which the air stream passes whereby an area of low pressure is produced on a face of said wall at said edge and oil is induced to travel along said face and to spill over said edge into said air stream to provide an oil mist.

6. An air cleaner comprising a shell having an uncleansed air inlet; a cleansed air outlet; an oil mist chamber in said shell intermediate said inlet and outlet; a separator for air, foreign particles and oil disposed between said oil mist chamber and outlet; an oil sump for supply of oil to create said mist; and a wall disposed between said air inlet and oil mist chamber in the path of flow of air, said wall extending into said sump and serving as a way for the travel of oil out of said sump, said wall having a spilling edge over which the air stream passes whereby an area of low pressure is produced on a face of said wall at said edge and oil is induced to travel along said face and to spill over said edge into said air stream to provide an oil mist.

7. An air cleaner comprising a shell having an uncleansed air inlet; a cleansed air outlet; an oil mist chamber in said shell intermediate said inlet and outlet; an oil sump for supply of oil to create said mist; and a wall disposed between said air inlet and oil mist chamber in the path of flow of air, said wall extending into said sump and serving as a way for the travel of oil out of said sump, said wall having a slot through which the air stream passes whereby a low air pressure is produced on a face of said wall bordering the edges of said slot, oil is induced to travel over said face and spill into said slot to provide an oil mist.

8. An air cleaner comprising a shell having an uncleansed air inlet; a cleansed air outlet; an oil mist chamber in said shell intermediate said inlet and outlet; a separator for air, foreign particles and oil disposed between said oil mist chamber and outlet; an oil sump for supply of oil to create said mist; and a wall disposed between said inlet and oil mist chamber in the path of flow of air, said wall extending into said sump and serving as a way for the travel of oil out of said sump, said wall having a slot through which the air stream passes whereby a low air pressure is produced on a face of said wall bordering the edges of said slot, oil is induced to travel over the said face and spill into said slot to provide an oil mist.

9. An air cleaner comprising a shell having an uncleansed air inlet; a cleansed air outlet; an oil mist chamber in said shell intermediate said inlet and outlet; an oil sump for supply of oil to create said mist; and a petticoat disposed between said inlet and oil mist chamber in the path of flow of air, said petticoat having its skirt extending into said sump and serving as a way for the travel of oil out of said sump, said petticoat having slots ranging upwardly from said sump and through which the air stream passes whereby areas of low pressure are produced on the far face of said skirt at the margins of said slots, oil is induced to travel over said face and spill into said slots to provide an oil mist.

10. An air cleaner comprising a shell having an uncleansed air inlet; a cleansed air outlet; an oil mist chamber in said shell intermediate said inlet and outlet; a separator for air, foreign particles and oil disposed between said oil mist chamber and outlet; an oil sump for supply of oil to create said mist; and a petticoat disposed between said inlet and oil mist chamber in the path of flow of air, said petticoat extending into said sump and serving as a way for the travel of oil out of said sump, said petticoat having slots ranging upwardly from said sump and through which the air stream passes whereby areas of low pressure are produced on the far face of said skirt at the margins of said slots, oil is induced to travel over said face and spill into said slots to provide an oil mist.

In witness that I claim the foregoing I have hereunto subscribed my name this 22nd day of March, 1931.

JOHN A. MOSHER.